March 20, 1962 — L. A. BOTKIN — 3,025,893
LIQUID LEVEL DETECTOR
Filed Oct. 14, 1960 — 3 Sheets-Sheet 3

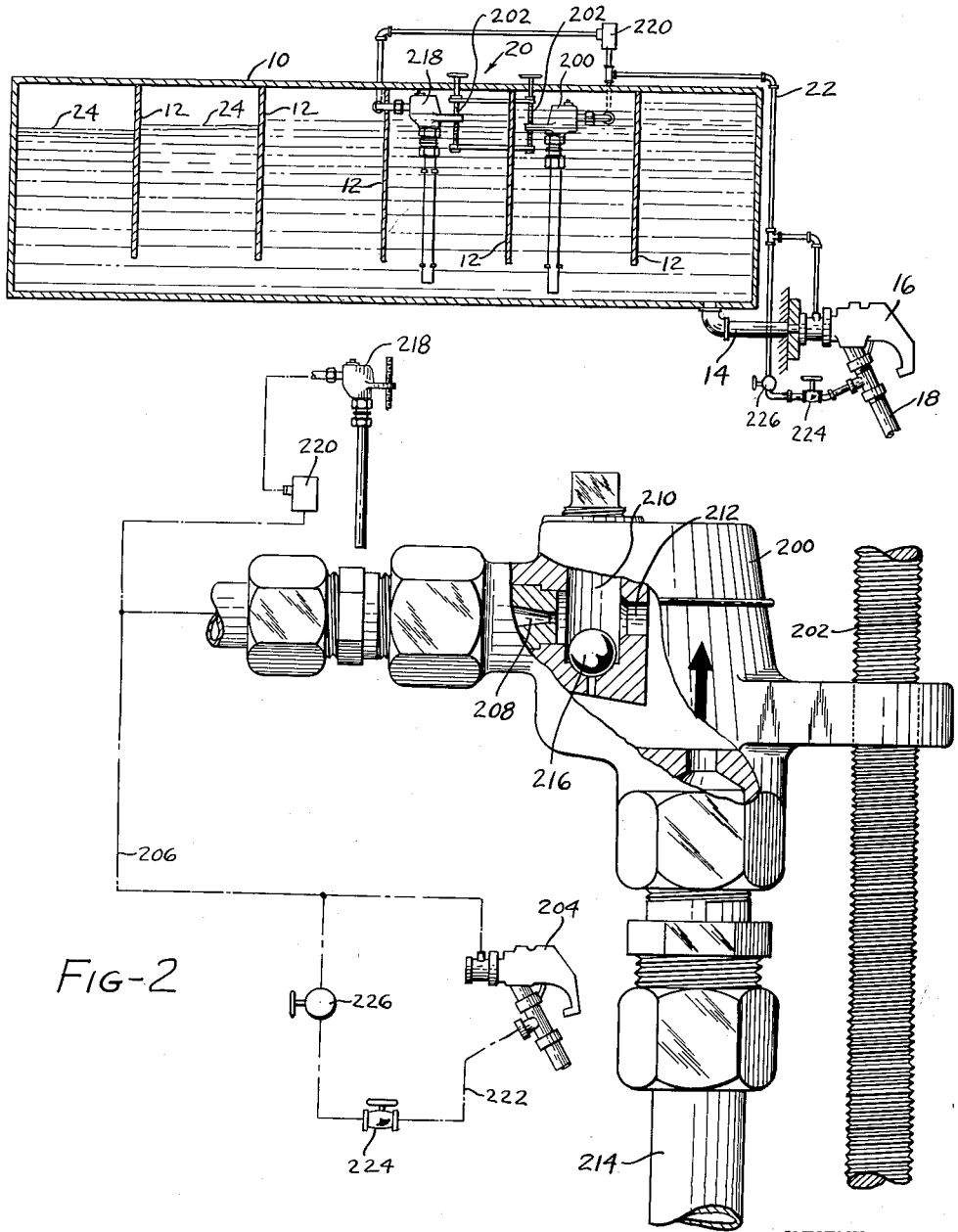

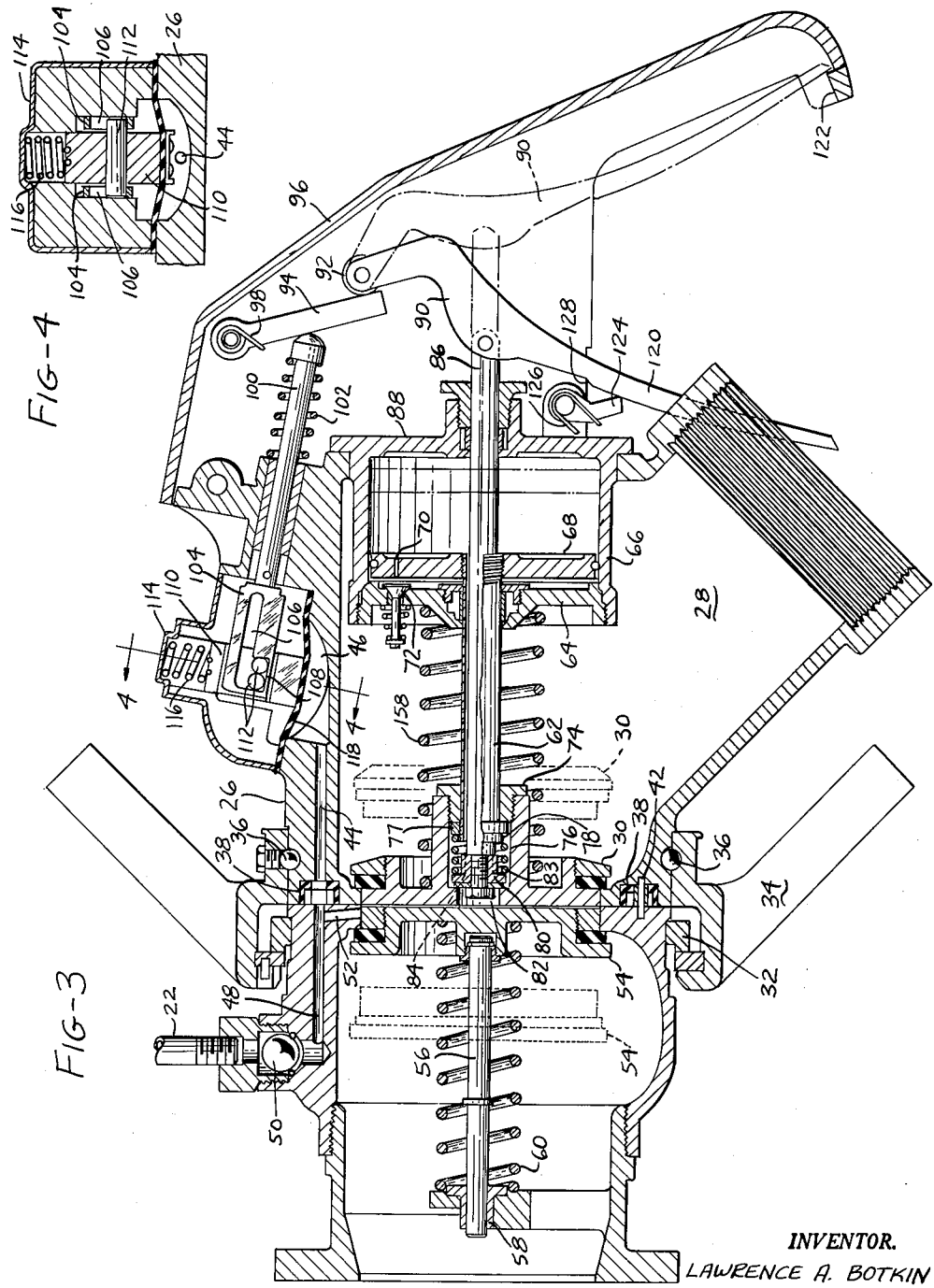

INVENTOR.
LAWRENCE A. BOTKIN
BY Toulmin & Toulmin
ATTORNEYS

United States Patent Office 3,025,893
Patented Mar. 20, 1962

3,025,893
LIQUID LEVEL DETECTOR
Lawrence A. Botkin, Dayton, Ohio, assignor to Buckeye Iron & Brass Works, Dayton, Ohio, a corporation of Ohio
Filed Oct. 14, 1960, Ser. No. 62,673
20 Claims. (Cl. 141—128)

This invention relates to a system for dispensing liquids, such as fuels and the like, and is particularly concerned with a system of this nature employing automatic dispensing valves and arrangements for tripping the valves closed.

Automatic valves of the nature referred to are known and are widely used in connection with the dispensing of fuels and the like. Such systems include valves with latches to hold the valves open with means being provided for tripping the latch into releasing position when the liquid level in the container or receiver reaches a predetermined level.

When dispensing small quantities of fluid into small receivers, such as automobile fuel tanks, it is adequate to trip the valve closed whenever the level reaches a predetermined point. With extremely large receivers, or containers, such as tank trucks, or locomotive fuel tanks or the like, a tripping in this manner could lead to underfilling because the rate at which the liquid is supplied to such a large container produces a substantially different level in the region of the dispensing nozzle or valve than it does at the remote regions in the receiver or container.

With an arrangement of this nature, it is preferred for the liquid to level out within the container before tripping the nozzle or valve whereby to insure accurate filling of the container or receiver.

A system providing for accurate filling of large containers or receivers is illustrated in my co-pending application Serial No. 831,826, filed August 5, 1959, and entitled "Automatic Nozzle." The present application is by way of being a continuation in part application based on the pending application referred to above.

A particular object of the present invention is the provision of a novel liquid level detector that will provide for accurate filling of large containers by automatic nozzles, even when the filling is carried out at high rates of fluid flow.

Another object of this invention is the provision of a liquid level detector for an automatic tripping nozzle which is sensitive to two preselectable liquid levels so that the rate of delivery from the nozzle can be reduced at the first level thereby permitting the liquid in the receiver to level out so that an accurate quantity of liquid is in the container at the second trip-off point.

Still another object of this invention is the provision of a dual level liquid level detector means for use with automatic tripping valves which is easily adjustable to vary the two levels at which the detector means is sensitive.

A still further object of this invention is the provision of the combination of an automatic trip nozzle and a liquid level detector means associated therewith which includes means for checking the operability of the system to provide for substantially fail-safe operation.

These and other objects and advantages will become more apparent upon reference to the drawings in which:

FIGURE 1 is a more or less diagrammatic view showing a receiver in the form of the tank of a tank truck or the like and with liquid being supplied thereto from a dispensing nozzle;

FIGURE 2 is a more or less diagrammatic representation of the detector system with one unit of the dual level detector means drawn at enlarged scale and partly in section;

FIGURE 3 is a vertical longitudinal section through the automatic tripping valve drawn at enlarged scale and showing the valve in its closed position;

FIGURE 4 is a sectional view indicated by line 4—4 on FIGURE 3 showing the tripping mechanism of the valve in section;

Figure 6:
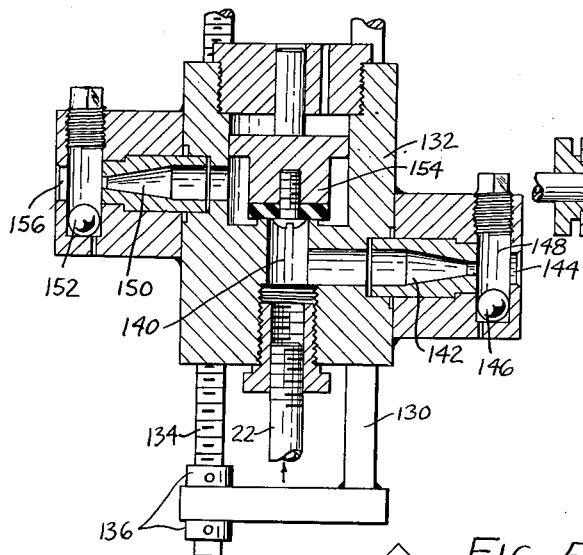
FIGURE 6 is a sectional view through a liquid level detector means operable for detecting two liquid levels but in which the two levels are fixed with regard to their spacing relative to each other.

Referring to the drawings somewhat more in detail, in FIGURE 1 there is shown rather diagrammatically a tank 10 having partitions or baffles 12 therein extending downwardly from the top and which are provided for the purpose of preventing excessive movement of the liquid in the tank when it is being transported.

The tank is provided with an inlet fitting at 14 through which it is filled via valve 16 according to this invention which has a supply hose 18 leading thereto.

In about the middle of the tank there is a liquid level detector means generally indicated at 20 which is connected by conduit 22 with the tripping mechanism of the valve so that when the liquid level in the tank rises to a predetermined level as detected by the detector the valve will trip closed.

A problem that arises in connection with tanks of this nature, particularly when they are filled rapidly is indicated by the varying liquid levels 24 in the several compartments formed by the baffles 12. It will be evident that the liquid levels in the various compartments vary when the tank is being filled at high speed and for this reason the detection of the level in the tank by the level detector is not reliable. For this reason, the present invention embodies a detector and valve combination in which a first level is detected at which time the valve trips partly closed and the final filling of the tank is accomplished at reduced rate thus giving the liquid levels in the several compartments ample time to equalize.

At a second and somewhat higher level, a second tripping of the valve takes place and at this time it closes off completely.

Figure 5:
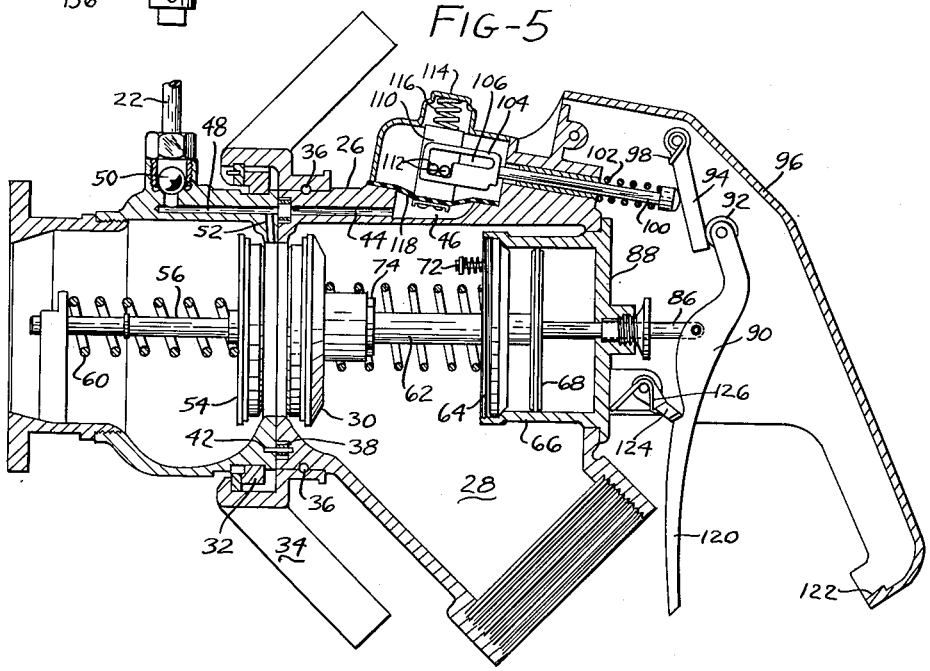
FIGURE 5 is a sectional view similar to FIGURE 3 by showing the valve in the reduced flow position which it occupies after being tripped from full flow position by operation of the detector unit which detects the lower liquid level.

Referring now to FIGURES 3 through 5, the valve according to the present invention comprises a valve body 26 having a flow passage 28 therethrough that is controlled by valve member 30. The valve body is adapted for being attached to the inlet fitting 14 of the tank by an interrupted thread mechanism consisting of lug means 32 on inlet fitting 14 which cooperates with the manually rotatable ring 34 that is rotatably mounted on the valve body as by the balls 36.

The valve body 26 has an annular groove therein surrounding the port that is controlled by valve member 30 and located within the groove is a generally U-shaped rubber-like seal member 38, which engage the face of the tank inlet fitting 14 under pressure so as to provide a seal between the valve body and the tank inlet fitting.

One or more dowels 42 may be provided for accurately aligning the valve body with the inlet fitting. At one side of the valve body there is a passage 44 leading from diaphragm chamber 46 through the seal ring 38 and communicating with a passage 48 that is connected via check valve 50 with conduit 22 which, as previously mentioned leads to the liquid level detecting device.

This passage 48 also communicates via a metering passage 52 with the port in inlet fitting 14 through which fluid is supplied from the valve. This port is normally closed by valve member 54 mounted on a stem 56 slidable in a bushing 58 in the inlet fitting with there being compression spring 60 normally biasing the valve member toward its closed position. When closed, valve member 54 substantially closes off the inner end of the passage 52.

Returning to the structure of the valve, valve member 30 is attached to the end of a tube 62 which extends backwardly from the valve member and passes sealingly through a closure wall 64 at one end of a dash pot cylinder 66. Inside the cylinder tube 62 is connected with a piston 68 having restricted port 70 extending therethrough. The closure wall 64 is provided with a check valve 72 which prevents fluid flow leftwardly through the closure wall but which yields to permit fluid to pass rightwardly therethrough.

The tube 62 extends through a nut 74 attached to a projection on the back of valve member 30 and on the tube that is located within the cavity 76 formed by the projection and the nut 74 there is a nut 77 that has a flange portion 78 extending beyond the end of tube 62.

Located within the cavity 76 is a pilot valve member 80 adapted for engaging the bottom of cavity 76 to close a port 82 therein that opens through the valve member. Spring 83 urges the pilot valve member toward position to close port 82.

Pilot valve member 80 is provided with axial ribs 84 on the back adapted for engaging flange 78. This arrangement provides for engagement of the pilot valve member with the said flange in such a manner that fluid flow can take place through tube 62 and about the pilot valve member 80 and into port 82.

The pilot valve member 80 is connected to the end of a rod 86 that extends through tube 62 with clearance and completely through dash pot chamber 66 and sealingly through the back wall 88 thereof. At its rear end outside the valve body rod 86 is pivotally connected with operating lever 90. This lever has a roller 92 at its upper end adapted for engaging an arm 94 pivoted in the frame part 96 that is fixedly attached to the valve body and with there being a torsion spring 98 urging arm 94 in a counterclockwise direction.

Arm 94 on the side opposite roller 92 engages the end of a plunger 100 spring urged rightwardly by a spring 102. This plunger is slidably mounted in the valve body and its end opposite its abutment with arm 94 is connected with a block 104 having a slot 106 extending in the direction of the axis of the plunger and which slot has an enlarged end portion 108.

The member or block 104 is also slotted longitudinally and between the legs thereof there is mounted a slide block or member 110 having rollers 112 that extend into slot 106 and the enlarged portion 108 thereof. Slide member 110 and block 104 are enclosed within a housing 114 and a spring 116 therein presses slide member 110 downwardly so that rollers 112 when positioned in the enlarged portion 108 of the slot will be moved downwardly toward the bottom thereof. At its lower end slide member 110 is attached to diaphragm 118 which closes the previously mentioned diaphragm chamber 46. At this point it will be evident that plunger 100 will be supported in its FIGURE 3 position by rollers 112 in the lower end of enlarged portion 108 of the slot in block 104 but that a supply of pressure to diaphragm chamber 46 will cause the diaphragm to flex upwardly and to move slide member 110 upwardly to dispose rollers 112 in alignment with the elongated portion of slot 106 and with the rollers so disposed the plunger 100 can then be moved leftwardly.

Returning now to lever 90, this lever also comprises a finger portion 120 which can be availed of for moving the lever rightwardly to open the valve. When the valve is wide open the lower end of portion 120 of the lever can be shifted laterally and disposed behind the ledge or abutment 122 formed on frame 96 to hold the valve open.

Another element which serves to control the lever 90 is a recycling latch pawl 124 pivoted to back wall 88 of the dash pot cylinder and biased by a spring 126 toward position to engage portion 128 of lever 90 and when the latch pawl is so engaged with the lever the valve will be cracked open for reduced flow therethrough.

As mentioned previously the valve is shown completely closed in its full line position in FIGURE 3 and completely open in its dot-dash position.

In FIGURE 5 the valve is shown with lever 90 stopped by latch pawl 124 so that the valve member of the valve is cracked open for a reduced rate of flow therethrough.

Turning now to the structure of the liquid level detector, one form is illustrated in FIGURE 6 wherein it will be seen that the detector comprises support rod 130 on which is slidable an orifice block 132. This block is threaded to a second rod 134 which is held against axial movement relative to rod 130 as by collars 136. A hand wheel is attached to the upper end of threaded rod 134 so that by availing of the hand wheel rod 134 can be rotated thus to adjust the vertical position of orifice block 132.

The orifice block has a cavity 140 therein to which is connected the previously mentioned conduit 22 that leads to the valve tripping mechanism. Communicating with chamber 140 at a lower level is a nozzle 142 which normally discharges through a port 144. A ball 146 of a size to close off port 144 is mounted in cavity 148 so that when the liquid level rises and the ball, which is in the liquid being dispensed is effected thereby and, the part will be closed off by the ball thus impeding the discharge from nozzle 142 and cause a build up of pressure which will be reflected backwardly through conduit 22 to the tripping mechanism of the valve.

With reference to the nature of the ball, this is referred to as a float ball but it will be understood that it is not necessary for the ball to float on the liquid being dispensed. While a floating ball will operate according to this invention, it is also the case that a ball which will not float in the liquid, for example, a nylon ball in gasoline or fuel oil, will be perfectly operative. What occurs is that the liquid that accumulates in the ball chamber has a buoying effect on the ball and the fluid in the chamber is agitated by the jet passing through a chamber and in the matter and course of events, the ball is drawn into a jet stream and forced against the port against which it is supposed to seat.

The hydraulic principle involved is that the fluid velocity on the upper side of the ball on account of the jet is higher than on the bottom side of the ball so that as the liquid level rises into the region of the jet, the high velocity flow above the ball causes the somewhat buoyed up ball to tend to center itself in the jet stream and thus to be forced thereby against the discharge opening, obtaining the desired effect. It will thus be understood that when reference is made to a "float" ball, it is not intended to mean only such members as will actually float in the liquid being controlled by the device of the present invention.

A second nozzle 150 is positioned at an upper level in orifice block 132 and has a similar control float ball 152. The nozzles are separated by the time delay valve member 154 which is so selected as to weight that closing of port 144 will cause the dispensing valve 16 to trip and to commence to move toward its closed position. Thereafter, valve 154 will lift and communicate cavity 140 with nozzle 150 thus causing a pressure drop in conduit 22 which, as will be seen hereinafter, causes valve 16 to halt in its cracked position with the supply of fluid to conduit 22 discharging from nozzle 150 through port 156 until the said port is closed by the second float ball 152 and at which time valve 16 will again trip and this time to its closed position.

When valve 154 lifts, the area thereof exposed to liquid from conduit 22 is greatly increased so that the valve will remain lifted under less than latch tripping pressure although it is necessary to develop latch tripping pressure to lift the valve off its seat.

*Operation*

In operation, the valve is connected with the inlet fitting by availing of the mechanism provided for this purpose. The conduit 22 is also connected with the valve and liquid can now be dispensed through the valve into the tank. This is accomplished by drawing lever 90 backwardly to its dot-dash position in FIGURE 3. The opening of the valve is preceded by the opening of port 82 by the pilot valve member because the rod first moves the pilot valve member opening the said port until the pilot valve member abuts flange 78 on nut 77. The opening of pilot valve member exhausts fluid from the right side of piston 68 so that this side of the piston is now under low pressure. The left side of the piston however is subjected to the pressure within the flow passage within the valve. The pressures on the opposite sides of piston 68 cannot equalize because the restricted passage 70 in the piston cannot supply fluid as rapidly as the fluid will pass through tube 62 and out past the pilot valve.

Accordingly, the movement of the valve member 30 toward its open position can be accomplished relatively easily even against the bias of the relatively strong closing spring 158. As the valve member opens and permits pressure fluid to act against the face of valve member 54, this valve member will yield and fluid will commence to flow through the inlet fitting to the tank. When lever 90 is drawn completely backwardly it can be latched on the fixed abutment 122, as described, and the valve will be retained in its fully open position.

Should it occur, through faulty mounting of the valve body on the inlet fitting, or through the failure of the valve body and the inlet fitting to seat together properly on account of foreign matter therebetween, that the valve and inlet fitting do not seal together opening of valve member 30 will cause such a rapid supply of fluid into the space between the valve body and inlet fitting that the pressure cannot bleed off via passage 48 and pressure fluid will enter passage 44 even before valve member 54 opens and the dispensing valve will be tripped closed. This provides an important safety feature, particularly in connection with inflammable, explosive, or corrosive fluids.

With the lever 90 latched in its wide open position, fluid will be supplied rapidly to tank 10 until the liquid level therein rises to the point that ball 146 will close port 144.

With fluid flowing through the inlet fitting the valve member 54 thereof is disposed in its FIGURE 3 dot-dash position and this permits fluid to pass through passage 52 to passages 44 and 48 and from the latter past check valve 50 to conduit 22 whence the fluid flows to chamber 140 in orifice block 132 and thence outwardly through nozzle 142 and port 144 into the tank until, on account of the rising liquid level in the tank, the ball 146 lifts high enough to bring about closing of port 144 thereby.

The closing of port 144 by ball 146, as described above, occurs very suddenly when the ball comes under the influence of the jet of fluid from nozzle 142. At the instant that the ball closes against port 144, there will be a sudden pressure rise in conduit 22 which is reflected back through passages 48 and 44 to diaphragm chamber 46 and this will cause the diaphragm to flex upwardly thus moving slide block 110 upwardly and carrying rollers 112 upwardly so that they align with slot 106. At this time the spring 158 will cause lever 90 to rock counterclockwise about its lower end which is retained by latch member 122. This occurs because arm 94 and plunger 100 yield under the bias of spring 158.

Valve member 30 is now moving toward its closed position but its movement is checked by dash pot piston 68 which can only move at the rate that fluid will flow from the left hand side thereof through restricted metering port 70. Due to the relatively slow movement of the valve member, immediately after the valve tripping mechanism operates, the time delay valve member 154 will lift and conduit 22 will commence to discharge through nozzle 150. This brings about a reduction in the pressure in conduit 22 and passages 48 and 44 and in the diaphragm chamber so that spring 116 again has the superior effect on the slide block 110 and diaphragm 118.

After a relatively small amount of movement of valve member 30, lever 90 is dragged to the point that its lower end will slip off abutment member 122. The lever 90 is now free to pivot about the end of rod 86 and does so, under the influence of springs 98 and 102, so that spring 102 is again effective for resetting the latch mechanism by moving plunger 100 rightwardly and at which time, due to the reduced pressure under diaphragm 118, the latch mechanism is reset to its FIGURE 3 position.

With the tripping mechanism reset, the valve member 30 continues on toward its closed position until lever 90 is pulled into engagement with the recycling latch pawl 124. This stops the lever 90 and the valve member so that the valve is cracked open as depicted in FIGURE 5. This permits a reduced rate of fluid flow through the valve and the liquid in the tank now rises at a slower rate while turbulence in the tank will subside and any liquid levels therein that differ from one another will have an opportunity to equalize.

The liquid level in the tank now rises until ball 152 is lifted as previously described in connection with ball 146 to cause closing of port 156 and at which time the valve tripping mechanism will again operate in the same manner as previously described except that the second tripping off of the valve will permit the valve member to go completely closed and the tripping mechanism will not reset.

The valve member 54 of the inlet fitting will also close so that the valve can now be uncoupled from the inlet fitting. Substantially no liquid will be lost at this time because the valve members are almost in face to face engagement.

Figure 7:
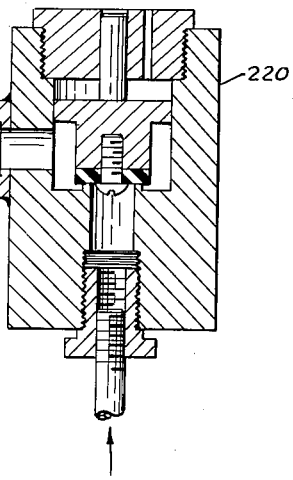
FIGURE 7 is a sectional view through a resistance valve employed in the system between the individual liquid level detecting units of the system of FIGURES 1 and 2.

A somewhat modified arrangement of the present invention pertaining particularly to the liquid level detecting means is illustrated in FIGURES 2 and 7. In the modification first described, the two liquid levels were displaced from each other a predetermined amount and were embodied in the same unit as the inertia valve interposed between the two jets. What is a preferred arrangement in many cases is the arrangement of FIGURES 2 and 7 and wherein each jet is embodied in a separate unit 200 associated with an adjusting screw 202.

The conduit leading from the control of nozzle 204 is indicated at 206 and supplies a jet from a nozzle 208 into a chamber 210 which normally discharges via opening 212 to a conduit 214 leading downwardly in the receiver being filled.

As before, when the liquid level rises in the receiver it also rises in conduit 214 to a point where ball 216 comes under the influence of the jet stream and will close passage 212 thus bringing about the pressure rise in the control system previously referred to which will trip the valve toward its closed position.

The second level detector at 218 has its inlet connected with conduit 206 via inertia valve 220 which is illustrated in FIGURE 7 and which will be seen to be substantially identical with the inertia valve of FIGURE 6 except that the nozzles making up the liquid level detecting means are employed in FIGURE 6 but not in FIGURE 7.

A further feature embodied in the present invention is illustrated in FIGURE 2 and this further feature comprises a checking arrangement for checking the operativeness of the detecting means so that a filling operation can be carried out with confidence that the detector and valve tripping means will be operative.

What this arrangement consists of is a branch conduit 222 leading from the upstream side of valve 204 through a regulating valve 224 and then a test valve 226. On the downstream side valve 226 is connected back to conduit 206.

By opening valve 226 fluid can be supplied to the liquid level detector 200 to provide for artificial flooding thereof which will cause actuation of ball 216 and will cause tripping off of the valve. In this manner, the operability of the system can readily be ascertained.

For checking purposes, where the conduit or tube 214 is accessible, checking of the operation of the detector can also be accomplished by stopping-off conduit 214 thus leading to the artificial flooding of the ball chamber, as referred above. This, of course, could be accomplished by a valve in conduit or tube 214, if so desired, which would permit the checking operation to be carried out from a remote position as might be necessary if the detector were already mounted in a container.

It will be understood that this invention is susceptible to modification in order to adapt it to different usages and conditions; and, accordingly, it is desired to comprehend such modifications within this invention as may fall within the scope of the appended claims.

I claim:

1. In a liquid level detector; a body member, a flow passage in said body member, a nozzle connected with the flow passage and extending laterally from said body, a chamber in the body at the discharge end of said nozzle, a port in the body connecting said chamber with the container in which said detector is located, said port in axial alignment with said nozzle and being larger than the discharge end of said nozzle so the nozzle will normally freely discharge therethrough, a control element loosely disposed in said chamber, a restricted opening in the bottom of said chamber communicating the chamber with the container so that as the liquid rises in the container it can flow in said chamber and influence said control element, and said control element being larger than said port so as to seat against said port and interrupting the discharge from said nozzle at a predetermined liquid level in the container.

2. In a liquid level detector; a body member, a flow passage in said body member, a nozzle connected with the flow passage and extending laterally from said body, a chamber in the body at the discharge end of said nozzle, a port in the body connecting said chamber with the container in which said detector is located, said port in axial alignment with said nozzle and being larger than the discharge end of said nozzle so the nozzle will normally freely discharge therethrough, a control element moveably disposed in said chamber, a restricted opening in the bottom of said chamber communicating the chamber with the container so that as the liquid rises in the container it can flow in said chamber and influence said control element, and said control element being larger than said port so as to seat against said port and interrupting the discharge from said nozzle at a predetermined liquid level in the container, said body being mounted in said container for vertical adjustability therein to change the liquid level at which the discharge from the nozzle is interrupted.

3. In a liquid level detector; a body member, a flow passage in said body member, a nozzle connected with the flow passage and extending laterally from said body, a chamber in the body at the discharge end of said nozzle, a port in the body connecting said chamber with the container in which said detector is located, said port in axial alignment with said nozzle and being larger than the discharge end of said nozzle so the nozzle will normally freely discharge therethrough, a control element moveable in said chamber, a restricted opening in the bottom of said chamber communicating the chamber with the container so that as the liquid rises in the container it can flow in said chamber and influence said control element, and said control element being adapted to seat against said port and interrupt the discharge from said nozzle at a predetermined liquid level in the container, said body being mounted in said container for vertical adjustability therein to change the liquid level at which the discharge from the nozzle is interrupted, there being a pair of said nozzles and pertaining control elements connected to said flow passage at different levels, and an inertia valve in the passage between the nozzles normally closing the passage being responsive to a pressure surge in said passage when the lower of said nozzles has the discharge therefrom interrupted for opening said passage to make the higher of said nozzles effective.

4. In a liquid level detecting arrangement for detecting liquid levels in a container being supplied with liquid from a valve that can be tripped closed in response to pressure signals delivered thereto; a pair of detector units, each unit comprising a body located in the container, a flow passage in each body, a nozzle in each body connected to the flow passage, said nozzle discharging a jet stream, a port in each body through which the pertaining nozzle normally discharges its jet stream, a chamber formed in each body between the discharge end of the nozzle and its pertaining said port, a drain passage leading from each said port to the container so that the nozzles normally freely discharge into the container, a control element movably disposed in each said chamber, a restricted aperture connecting each chamber at the bottom with the pertaining drain passage, each control element being larger than the said port in the pertaining chamber so that upon liquid level in the container rising until liquid flows through the restricted aperture in the said chamber, the control element will be influenced by the liquid so as to be drawn into the jet stream from the pertaining nozzle and close off the pertaining port thereby to interrupt discharge from the pertaining nozzle and create a valve tripping pressure surge in the flow passage, said flow passage being adapted for receiving liquid from said valve and being operatively connected with the tripping mechanism thereof.

5. In a liquid level detecting arrangement for detecting liquid levels in a container being supplied with liquid from a valve that can be tripped closed in response to pressure signals delivered thereto; a pair of detector units, each unit comprising a body located in the container, a flow passage in each body, a nozzle in each body connected to the flow passage, a port in each body through which the pertaining nozzle normally discharges, a chamber formed in each body between the discharge end of the nozzle and its pertaining said port, a drain passage leading from each said port to the container so that the nozzles normally freely discharge into the container, a control element movably disposed in each said chamber normally located outside the jet stream of said nozzle, a restricted aperture connecting each chamber at the bottom with the pertaining drain passage, each control element being larger than the said port in the pertaining chamber so that upon liquid level in the container rising until liquid flows through the restricted aperture in the said chamber, the control element will come under the influence of said liquid and the jet stream from the nozzle and be moved into position to close off the pertaining port thereby to interrupt discharge from the pertaining nozzle and create a valve tripping pressure surge in the flow passage, said flow passage being adapted for receiving liquid from said valve and being operatively connected with the tripping mechanism thereof, said detector units being individually supported in the container for individual filling and adjustability therein.

6. In a liquid level detecting arrangement for detecting liquid levels in a container being supplied with liquid from a valve that can be tripped closed in response to pressure signals delivered thereto; a pair of detector units, each unit comprising a body located in the container, a flow passage in each body, a nozzle in each body connected to the flow passage, a port in each body through which the pertaining nozzle normally discharges, a chamber formed in each body between the discharge end of the nozzle and its pertaining said port, a drain passage leading from each said port to the container so that the nozzles normally freely discharge into the container, a control element in each said chamber, a restricted aperture connecting each chamber at the bottom with the pertaining drain passage, each control element being larger than the said port in the pertaining chamber so that upon liquid level in the container rising until liquid flows through the restricted aperture in the said chamber, the control element will come under the influence of said liquid and the jet stream from the nozzle and be moved into position to close off the pertaining port thereby to interrupt discharge from the pertaining nozzle and create a valve tripping pressure surge in the flow passage, said flow passage being adapted for receiving liquid from said valve and being operatively connected with the tripping mechanism thereof, there being an inertia valve interposed between the flow passages of said units adapted for interrupting the connection therebetween prior to the interruption of flow from the lower one of said nozzles and for establishing the connection between said flow passages after the interruption of flow from said lower nozzle.

7. In a liquid level detecting arrangement for detecting liquid levels in a container being supplied with liquid from a valve that can be tripped closed in response to pressure signals delivered thereto; a pair of detector units, each unit comprising a body located in the container, a flow passage in each body, a nozzle in each body connected to the flow passage, a port in each body through which the pertaining nozzle normally discharges, a chamber formed in each body between the discharge end of the nozzle and its pertaining said port, a drain passage leading from each said port to the container so that the nozzles normally freely discharge into the container, a control element in each said chamber, a restricted aperture connecting each chamber at the bottom with the pertaining drain passage, each control element being larger than the said port in the pertaining chamber so that upon liquid level in the container rising until liquid flows through the restricted aperture in the said chamber, the control element will come under the influence of said liquid and the jet stream from the nozzle and be moved into position to close off the pertaining port thereby to interrupt discharge from the pertaining nozzle and create a valve tripping pressure surge in the flow passage, said flow passage being adapted for receiving liquid from said valve and being operatively connected with the tripping mechanism thereof, there being an inertia valve interposed between the flow passages of said units adapted for interrupting the connection therebetween prior to the interruption of flow from the lower one of said nozzles and for establishing the connection between said flow passages after the interruption of flow from said lower nozzle, there being means independent of the supply of liquid from the nozzle to the flow passage for supplying liquid from the nozzle to the flow passage at an increased rate to provide for artificial flooding of the chamber pertaining to at least the lower one of said nozzles to check the operation of the liquid level detector means.

8. In a liquid level detector; a body, an inlet to said body, a lateral nozzle in the body connected to the inlet, a first chamber in the body into which the nozzle discharges, a port in the chamber axially aligned with the nozzle through which the nozzle normally freely discharges, a second chamber in the body receiving the liquid from the discharge port, a connection from said second chamber into the container for draining liquid from the second chamber, a control element in said first chamber larger than the said discharge port adapted to close the discharge port when moved into the region thereof, a restricted aperture connecting the bottom of said first chamber with said second chamber so that when the liquid level rises in the container to a predetermined point the control element will be acted upon by the said liquid and the jet stream from the nozzle to interrupt said discharge port, said inlet being adapted for receiving liquid at a controlled rate from a valve connected for filling said container, and there being means for selectively artificial flooding said first chamber to check the operation of the detector.

9. In a liquid level detector; a body, an inlet to said body, a lateral nozzle in the body connected to the inlet, a first chamber in the body into which the nozzle discharges, a port in the chamber axially aligned with the nozzle through which the nozzle normally freely discharges, a second chamber in the body receiving the liquid from the discharge port, a connection from said second chamber into the container for draining liquid from the second chamber, a control element in said first chamber larger than the said discharge port adapted to close the discharge port when lifted into the region thereof, a restricted aperture connecting the bottom of said first chamber with said second chamber so that when the liquid level rises in the container to a predetermined point the control element will come under the joint influence of the liquid in the chamber and the jet stream from the nozzle to interrupt said discharge port, said inlet being adapted for receiving liquid at a controlled rate from a valve connected for filling said container, and there being means for selectively supplying liquid to said inlet at an increased rate to provide for artificial flooding of said first chamber to check the operation of the detector, the connection from said second chamber to the container being restricted so as to permit said artificial flooding by increasing the rate of supply of fluid to said nozzle.

10. A liquid level detector adapted for detecting liquid levels in a container or the like and for transmitting pressure surges to the pressure operable tripping mechanism of a trippable filling valve supplying the said liquid comprising; body means, flow passage means extending through said body means, said flow passage means being adapted for connection with said valve to receive liquid therefrom, nozzle means at respectively different levels leading from said flow passage means into the container, means responsive to the liquid level in the container reaching a predetermined level relative to each of the nozzle means for suddenly interrupting the discharge from the pertaining nozzle means to create a pressure surge in the flow passage means, and resistance valve means in the flow passage means between said nozzle means operable to interrupt the passage means between the nozzle means prior to the interruption of discharge from the lower nozzle means and also operable in response to the pressure surge established in said passage means by the lower nozzle means for opening said passage means to make the higher nozzle means effective.

11. A liquid level detector adapted for detecting liquid levels in a container or the like and for transmitting momentary pressure surges to the pressure operable tripping mechanism of a trippable filling valve supplying the said liquid comprising; body means, flow passage means adapted for connection to said valve to receive liquid therefrom extending through said body means, first and second nozzle means communicating with said flow passage means at lower and upper levels respectively and arranged to discharge into the container, means responsive to the liquid level in the container reaching a predetermined level relative to each of the nozzle means for suddenly interrupting the discharge from the pertaining nozzle means to create the said pressure surge in said flow passage, and resistance valve means in the flow passage between said nozzle means normally interrupting the passage means between the nozzle means prior to the interruption of discharge from the lower nozzle means and also operable in response to a pressure surge established in said passage means between said lower nozzle means and said resistance valve when the lower nozzle means has established said pressure surge for opening said passage means to make the higher nozzle means effective, and means supporting said body means for vertical adjustability in said container to vary the liquid levels at which the nozzle means become operative.

12. In a liquid level detector for detecting liquid levels in a container being supplied with liquid from a self-tripping nozzle and said detector being operable to create nozzle tripping pressure surges; a body, a flow passage in the body adapted for connection with said nozzle to receive liquid therefrom, first and second nozzle means communicating with said passage at respectively lower and upper levels, each nozzle means normally discharging freely to the container, means associated with the nozzle means operable when the liquid level in the container rises to the pertaining nozzle means for suddenly interrupting the discharge from the said nozzle means thereby to create a pressure surge in the flow passage constituting the nozzle tripping pressure surge, and an inertia valve in the flow passage between said nozzle means normally closing said passage between said nozzle means prior to the interrupting of the discharge from said first nozzle means and responsive to a pressure surge developed in the passage between the inertia valve and said first nozzle means for establishing said passage between said nozzle means, said inertia valve remaining in passage establishing position under a substantially lower pressure than is required to move it into said position.

13. In combination; a container to received liquid, an automatic valve communicating with the container having a single flow passage therethrough and having a single valve member therein controlling said passage and spring urged toward closed position but movable to open position to supply liquid to the container, liquid level detecting means in the container, a conduit connected to receive liquid from said valve and leading to said detecting means, said detecting means being operable to detect first and second liquid levels in the container and to develop momentary pressure surges in the said conduit in response thereto, a single pressure operable latch operable to hold the valve open and connected to said conduit and responsive to a pressure surge in said conduit from the detecting means to release the valve member for movement toward closed position, a dash pot to retard the closing movement of the valve member, spring means to reset the latch following the tripping thereof by one of said momentary pressure surges, and pawl means positioned to operatively engage and halt the valve member after the latch has been reset and before the valve member is completely closed so the filling of the container will continue at reduced rate until a second pressure surge is transmitted from said detecting means through said conduit to said latch.

14. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, liquid level detecting means in the container hydraulically connected with said latch and operable to detect first and second liquid levels in the container and to develop first and second latch tripping pressure surges in response to said detections, at least said first pressure surge developed by said liquid level detecting means being of momentary duration whereby said latch, on account of the bias thereon, is reset automatically following the tripping thereof on account of said first pressure surge.

15. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, liquid level detecting means in the container hydraulically connected with said latch and operable to detect first and second liquid levels in the container and to develop first and second latch tripping pressure surges in response to said detections, at least said first pressure surge developed by said liquid level detecting means being of momentary duration whereby said latch, on account of the bias thereon, is reset automatically following the tripping thereof on account of said first pressure surge, there being means to retard the movement of the valve member from its first position to its second position to permit the latch to reset in the interval between said first and second pressure surges.

16. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, a single pilot passage leading from the flow passage of the valve to the latch and also leading to said container so that sudden interruption of the pilot passage at the container end thereof will develop a tripping pressure surge in the pilot passage which will be transmitted to the latch, liquid level detecting means in the container through which the pilot passage extends, a first port in the detector forming the discharge end of the passage, means operable in response to the liquid reaching a first liquid level in the container for suddenly interrupting said first port to thereby develop a first pressure surge in the pilot passage, a second port in the detector at a higher level than said first port, normally closed inertia valve means blocking off the second port from the pilot passage and operable for opening upon the development of said pressure surge developed in said pilot passage by the interruption of said first port to connect the second port with the pilot passage and thereby relieve the said pressure in the pilot passage, and means operable upon the liquid reaching the said higher level in the container for suddenly interrupting said second port to thereby develop a second pressure surge in said pilot passage.

17. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, a single pilot passage leading from the flow passage of the valve to the latch and also leading to said container so that sudden interruption of the pilot passage at the container end thereof will develop a tripping pressure surge in the pilot passage which will be transmitted to the latch, liquid level detecting means in the container through which the pilot passage extends, a first port in the detector forming the discharge end of the passage, means operable in response to the liquid reaching a first liquid level in the container for suddenly interrupting said first port to thereby develop a first pressure surge in the pilot passage, a second port in the detector at a higher level than said first port, normally closed inertia valve means blocking off the second port from the pilot passage and operable for opening upon the development of said pressure surge developed in said pilot passage by the interruption of said first port to connect the second port with the pilot passage and thereby relieve the said pressure in the pilot passage, and means operable upon the liquid reaching the said higher level in the container for suddenly interrupting said second port to thereby develop a second pressure surge in said pilot passage, said inertia valve means having a small area exposed to the pilot passage adjacent said first port while the inertia valve is closed and a larger area so exposed when the inertia valve is open so as to maintain the second port and pilot passage connected when the pressure in the pilot passage drops following the opening of the inertia valve means.

18. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, a single pilot passage leading from the flow passage of the valve to the latch and also leading to said container so that sudden interruption of the pilot passage at the container end thereof will develop a tripping pressure surge in the pilot passage which will be transmitted to the latch, liquid level detecting means in the container through which the pilot passage extends, a first port in the detector forming the discharge end of the passage, means operable in response to the liquid reaching a first liquid level in the container for suddenly interrupting said first port to thereby develop a first pressure surge in the pilot passage, a second port in the detector at a higher level than said first port, normally closed inertia valve means blocking off the second port from the pilot passage and operable for opening upon the development of said pressure surge developed in said pilot passage by the interruption of said first port to connect the second port with the pilot passage and thereby relieve the said pressure in the pilot passage, and means operable upon the liquid reaching the said higher level in the container for suddenly interrupting said second port to thereby develop a second pressure surge in said pilot passage, there being means to retard the movement of the valve member of said automatic valve from its said first position to its said second position to permit the latch to reset following the development of said first pressure surge in said pilot passage and prior to the development of said second pressure surge in said pilot passage.

19. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, a single pilot passage leading from the flow passage of the valve to the latch and also leading to said container so that sudden interruption of the pilot passage at the container end thereof will develop a tripping pressure surge in the pilot passage which will be transmitted to the latch, liquid level detecting means in the container through which the pilot passage extends, a first port in the detector forming the discharge end of the passage, means operable in response to the liquid reaching a first liquid level in the container for suddenly interrupting said first port to thereby develop a first pressure surge in the pilot passage, a second port in the detector at a higher level than said first port, normally closed inertia valve means blocking off the second port from the pilot passage and operable for opening upon the development of said pressure surge developed in said pilot passage by the interruption of said first port to connect the second port with the pilot passage and thereby relieve the said pressure in the pilot passage, and means operable upon the liquid reaching the said higher level in the container for suddenly interrupting said second port to thereby develop a second pressure surge in said pilot passage, and means supporting the said detecting means in the container operable from externally of the container for vertically adjusting the detecting means in the container.

20. In combination; a container to receive liquid, an automatic valve communicating with the container having a single flow passage therethrough and having a single valve member therein controlling said passage, said valve member having a first wide open position, a second partly open position, and a third closed position, means biasing the valve member toward its third position, a single pressure sensitive latch normally biased to latch the valve member in its first and second positions and trippable in response to a first pressure surge a first time to release the valve member from its first position and trippable in response to a second pressure surge a second time to release the valve member from its second position, a single pilot passage leading from the flow passage of the valve to the latch and also leading to said container so that sudden interruption of the pilot passage at the container end thereof will develop a tripping pressure surge in the pilot passage which will be transmitted to the latch, liquid level detecting means in the container through which the pilot passage extends, a first port in the detector forming the discharge end of the passage, means operable in response to the liquid reaching a first liquid level in the container for suddenly interrupting said first port to thereby develop a first pressure surge in the pilot passage, a second port in the detector at a higher level than said first port, normally closed inertia valve means blocking off the second port from the pilot passage and operable for opening upon the development of said pressure surge developed in said pilot passage by the interruption of said first port to connect the second port with the pilot passage and thereby relieve the said pressure in the pilot passage, and means operable upon the liquid reaching the said higher level in the container for suddenly interrupting said second port to thereby develop a second pressure surge in said pilot passage, said detecting means comprising first and second body members containing said first and second ports respectively and located in said container, and means supporting said body members in said container operable from externally of said container for independently vertically adjusting said body members in said container to vary the respective levels of said ports.

References Cited in the file of this patent

UNITED STATES PATENTS

| | | |
|---|---|---|
| 2,314,273 | Gunderson | Mar. 16, 1943 |
| 2,528,747 | Gravelle | Nov. 7, 1950 |
| 2,681,073 | Fraser | June 15, 1954 |
| 2,840,122 | Klikunas et al. | June 24, 1958 |
| 2,948,307 | Rittenhouse et al. | Aug. 9, 1960 |